(12) United States Patent
Cigal et al.

(10) Patent No.: US 10,422,245 B2
(45) Date of Patent: Sep. 24, 2019

(54) SEAL ELEMENT WITH INTERNAL LUBRICANT PLENUM FOR ROTATIONAL EQUIPMENT

(71) Applicant: United Technologies Corporation, Farmington, CT (US)

(72) Inventors: Brian P. Cigal, Windsor, CT (US); Christopher T. Anglin, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 242 days.

(21) Appl. No.: 15/471,708

(22) Filed: Mar. 28, 2017

(65) Prior Publication Data

US 2018/0283210 A1 Oct. 4, 2018

(51) Int. Cl.
| | | |
|---|---|---|
| *F01D 25/12* | (2006.01) | |
| *F04D 29/08* | (2006.01) | |
| *F01D 11/00* | (2006.01) | |
| *F16J 15/16* | (2006.01) | |
| *F16J 15/34* | (2006.01) | |
| *F01D 25/28* | (2006.01) | |

(52) U.S. Cl.
CPC ............ *F01D 25/12* (2013.01); *F01D 11/003* (2013.01); *F01D 25/28* (2013.01); *F16J 15/164* (2013.01); *F16J 15/3404* (2013.01); *F05D 2220/32* (2013.01); *F05D 2240/60* (2013.01); *F05D 2260/20* (2013.01); *Y02T 50/675* (2013.01)

(58) Field of Classification Search
CPC .......... F01D 25/12; F01D 25/28; F01D 25/18; F01D 25/183; F01D 11/003; F16J 15/3404; F16J 15/164; F04D 29/06; F04D 29/08; F05D 2260/20; F05D 2240/32; F05D 2220/32; Y02T 50/675
USPC ..................................... 415/180, 170.1, 230
See application file for complete search history.

(56) References Cited

U.S. PATENT DOCUMENTS

| | | | |
|---|---|---|---|
| 2,990,202 A | 6/1961 | Dennison et al. | |
| 2,992,842 A | 7/1961 | Shevchenko et al. | |
| 4,406,459 A * | 9/1983 | Davis .................. | F16J 15/3404 277/401 |

(Continued)

FOREIGN PATENT DOCUMENTS

GB 1454423 A 11/1976

OTHER PUBLICATIONS

EP search report for EP18164422 dated Aug. 29, 2018.

*Primary Examiner* — Hai H Huynh
(74) *Attorney, Agent, or Firm* — O'Shea Getz P.C.

(57) ABSTRACT

A sealing apparatus for rotational equipment includes an annular seal plate rotatable around an axis. The annular seal plate includes an annular seal land surface, an internal plenum, a plurality of inlet passages, a plurality of cooling passages and a plurality of outlet passages. The inlet passages are arranged about the axis. Each of the inlet passages extends into the annular seal plate to the internal plenum. The cooling passages are arranged about the axis. Each of the cooling passages extends into the annular seal plate from the annular seal land surface to the internal plenum. The outlet passages are arranged about the axis. Each of the outlet passages extends into the annular seal plate to the internal plenum. The outlet passages are arranged radially between the inlet passages and the cooling passages.

19 Claims, 9 Drawing Sheets

(56) References Cited

U.S. PATENT DOCUMENTS

| | | |
|---|---|---|
| 4,406,460 A | 9/1983 | Slayton |
| 4,463,994 A | 8/1984 | Eliason et al. |
| 4,928,978 A * | 5/1990 | Shaffer .................. F01D 25/183 |
| | | 277/401 |
| 5,464,227 A | 11/1995 | Olson |
| 5,755,817 A | 5/1998 | Prouty et al. |
| 6,196,790 B1 | 3/2001 | Sheridan et al. |
| 8,167,314 B2 | 5/2012 | Ullah |
| 8,336,885 B2 | 12/2012 | Freling |
| 8,777,229 B2 | 7/2014 | Davis |
| 8,845,282 B2 | 9/2014 | LaPierre et al. |
| 9,039,013 B2 | 5/2015 | Artiles et al. |
| 9,163,522 B2 | 10/2015 | Davis et al. |
| 9,546,560 B2 | 1/2017 | Larson |
| 9,909,438 B2 * | 3/2018 | Duffy .................... F01D 11/003 |
| 2015/0152746 A1 | 6/2015 | Maret et al. |
| 2016/0003100 A1 | 1/2016 | Walker et al. |

* cited by examiner

SEAL ELEMENT WITH INTERNAL LUBRICANT PLENUM FOR ROTATIONAL EQUIPMENT

BACKGROUND OF THE INVENTION

1. Technical Field

This disclosure relates generally to rotational equipment and, more particularly, to a rotational seal element for rotational equipment.

2. Background Information

Various types and configurations of sealing apparatuses are known in the art for sealing a gap between a rotating structure and a stationary structure. One such sealing apparatus includes a rotating seal plate that axially engages a stationary carbon seal element. During operation, frictional forces generated by the engagement between the seal plate and the seal element may cause a temperature of the seal plate to rise. Lubricant therefore may be provided to cool the seal plate. In some designs, for example, the seal plate may include a network of fluidly discrete internal cooling passages to flow the lubricant through the seal plate. While incorporation of such passages improves seal plate cooling, there is still room in the art for improvement.

SUMMARY OF THE DISCLOSURE

According to an aspect of the present disclosure, a sealing apparatus is provided for rotational equipment. This sealing apparatus includes an annular seal plate rotatable around an axis. The annular seal plate includes an annular seal land surface, an internal plenum, a plurality of inlet passages, a plurality of cooling passages and a plurality of outlet passages. The inlet passages are arranged about the axis. Each of the inlet passages extends into the annular seal plate to the internal plenum. The cooling passages are arranged about the axis. Each of the cooling passages extends into the annular seal plate from the annular seal land surface to the internal plenum. The outlet passages are arranged about the axis. Each of the outlet passages extends into the annular seal plate to the internal plenum. The outlet passages are arranged radially between the inlet passages and the cooling passages.

According to another aspect of the present disclosure, another sealing apparatus is provided for rotational equipment. This sealing apparatus includes an annular seal plate rotatable around an axis. The annular seal plate includes an annular seal land surface, an internal plenum, a plurality of inlet passages, a plurality of cooling passages and a plurality of outlet passages. The inlet passages are arranged about the axis. At least one of the inlet passages extends into the annular seal plate to the internal plenum. The cooling passages are arranged about the axis. At least one of the cooling passages extends into the annular seal plate from the annular seal land surface to the internal plenum. The outlet passages are arranged about the axis. At least one of the outlet passages extends into the annular seal plate to the internal plenum. The outlet passages are arranged radially between the inlet passages and the cooling passages.

According to another aspect of the present disclosure, another sealing apparatus is provided for rotational equipment. This sealing apparatus includes a stationary seal element and a rotational seal element rotatable around an axis. The rotational seal element includes a seal land surface, a plenum, a plurality of inlet passages, a plurality of cooling passages and a plurality of outlet passages. The seal land surface axially and sealingly engages the stationary seal element. The inlet passages are configured to receive lubricant from outside of the rotational seal element and supply the lubricant to the plenum. The cooling passages are configured to flow the lubricant between the plenum and an interface between the stationary seal element and the rotational seal element. The outlet passages are configured to discharge the lubricant from the plenum and out of the rotational seal element.

According to still another aspect of the present disclosure, a sealing apparatus is provided for a gas turbine engine. This sealing apparatus includes a stationary structure of the gas turbine engine, a gas turbine engine shaft rotatable around an axis, a stationary seal element mounted with the stationary structure, and a monolithic rotational seal element mounted with the gas turbine engine shaft. The monolithic rotational seal element includes a seal land surface and a fluid circuit. The seal land surface axially and sealingly engages the stationary seal element. The fluid circuit includes an annular plenum configured internally within the monolithic rotational seal element.

The fluid circuit may further include a plurality of inlet passages and/or a plurality of cooling passages and/or a plurality of outlet passages. The inlet passages may be arranged about the axis. Each of the inlet passages may extend into the monolithic rotational seal element to the annular plenum. The cooling passages may be arranged about the axis. Each of the cooling passages may extend into the monolithic rotational seal element from the seal land surface to the annular plenum. The outlet passages may be arranged about the axis. Each of the outlet passages may extend into the monolithic rotational seal element to the annular plenum.

The sealing apparatus may include a stationary seal element that axially engages the annular seal land surface. The axial engagement may substantially form a seal between the stationary seal element and the annular seal plate.

The internal plenum may be configured as or otherwise include an annular chamber disposed within the annular seal plate.

The annular seal plate may be a monolithic body.

The rotational seal element may be a monolithic body.

A first of the inlet passages may include an outlet orifice fluidly coupled with the internal plenum and located at a radial inner end of the internal plenum. A first of the outlet passages may include an inlet orifice fluidly coupled with the internal plenum. The inlet orifice may be located radially outboard of the outlet orifice. A first of the cooling passages may include a cooling passage orifice fluidly coupled with the internal plenum. The cooling passage orifice may be radially outboard of the inlet orifice.

The inlet orifice may be located radially next to the radial inner end of the internal plenum.

The cooling passage orifice may be located a non-zero radial distance from a radial outer end of the internal plenum.

The annular seal plate may extend axially along the axis between a first side and a second side. A first of the inlet passages and a first of the outlet passages may be disposed towards the first side. A first of the cooling passages may be disposed towards the second side.

The annular seal plate may include a lubricant scoop. The lubricant scoop may form an annular gutter. The inlet passages may fluidly couple and extend between the annular gutter and the internal plenum.

A first of the cooling passages may include a pocket and a conduit. The pocket may extend into the annular seal plate from the annular seal land surface. The conduit may fluidly couple and extend between the pocket and the internal plenum. A circumferential width of the pocket may be greater than a circumferential width of the conduit.

The rotational seal element may include a pocket that extends into the rotational seal element from the seal land surface. Two or more of the cooling passages may fluidly couple and extend between the pocket and the plenum.

The plenum may be formed within the rotational seal element and extend circumferentially about the axis.

Each of the inlet passages may extend into the rotational seal element to the plenum. Each of the cooling passages may extend into the rotational seal element from the seal land surface to the plenum. Each of the outlet passages may extend into the rotational seal element to the plenum.

A first of the outlet passages may be located radially outboard of a first of the inlet passages. A first of the cooling passages may be located radially outboard of the first of the outlet passages.

The first of the inlet passages may include an outlet orifice fluidly coupled with the plenum and located at a radial inner end of the plenum.

The first of the cooling passages may include a cooling passage orifice fluidly coupled with the plenum and located a non-zero radial distance from a radial outer end of the plenum.

The first of the outlet passages may include an inlet orifice fluidly coupled with the plenum and located radially next to the radial inner end of the plenum.

The foregoing features and the operation of the invention will become more apparent in light of the following description and the accompanying drawings.

DETAILED DESCRIPTION OF THE INVENTION

Figure 1:
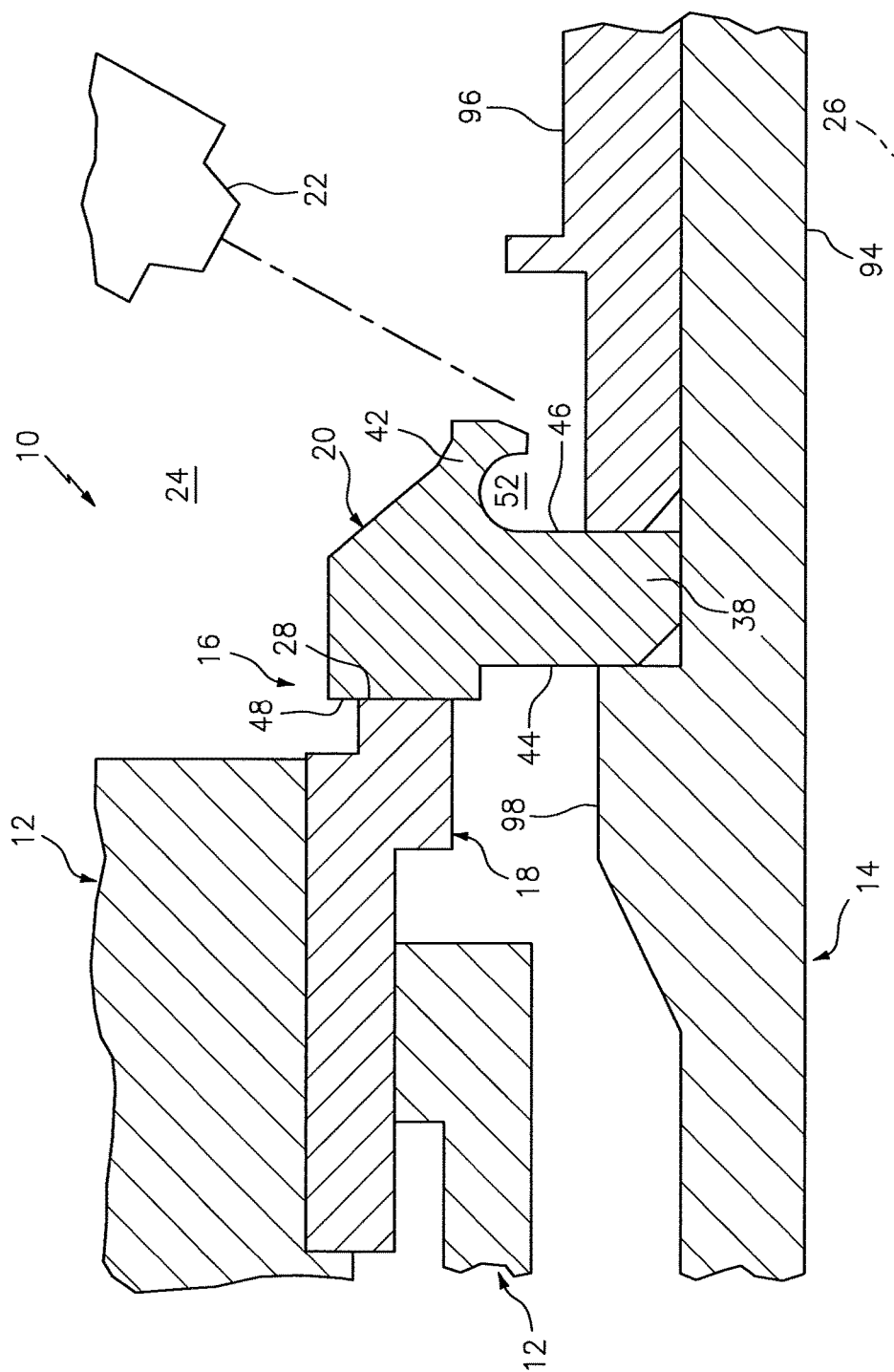
FIG. 1 is a schematic side-sectional illustration of an assembly for rotational equipment.

FIG. 1 illustrates an assembly 10 for rotational equipment. The rotational equipment may be configured as and is described below for ease of description as a gas turbine engine. This gas turbine engine may be configured as or included in an aircraft propulsion system (see FIG. 9), an auxiliary power unit (APU) or an industrial gas turbine engine. However, the present disclosure is not limited to such exemplary gas turbine engine applications. Furthermore, the assembly 10 may alternatively be configured for a wind turbine, a water turbine, a steam turbine or any other type of equipment which may include a seal apparatus as described below.

The assembly 10 of FIG. 1 includes a stationary structure 12, a rotational structure 14 and a sealing apparatus 16. This sealing apparatus 16 is configured to substantially seal an annular gap between the stationary structure 12 and the rotational structure 14. The sealing apparatus 16 includes a stationary seal element 18 and a rotational seal element 20. The assembly 10 of FIG. 1 also includes a lubrication system with one or more nozzles 22 (e.g., a circumferential array of nozzles) configured direct lubricant into a compartment 24 (e.g., a bearing compartment) of the gas turbine engine and towards the rotational seal element 20.

The stationary seal element 18 may be configured as an annular seal element such as, but not limited to, a carbon seal element. The stationary seal element 18 extends circumferentially about a rotational axis 26 of the assembly 10. The stationary seal element 18 extends axially along the axis 26 to a (e.g., annular) seal element surface 28. This seal element surface 28 is arranged perpendicular to the axis 26. The seal element surface 28 may be a substantially uninterrupted planar surface. Alternatively, the seal element surface 28 may be interrupted by one or more features; e.g., apertures, channels, slots, etc. The present disclosure, however, is not limited to the foregoing exemplary stationary seal element configurations.

Figure 2:
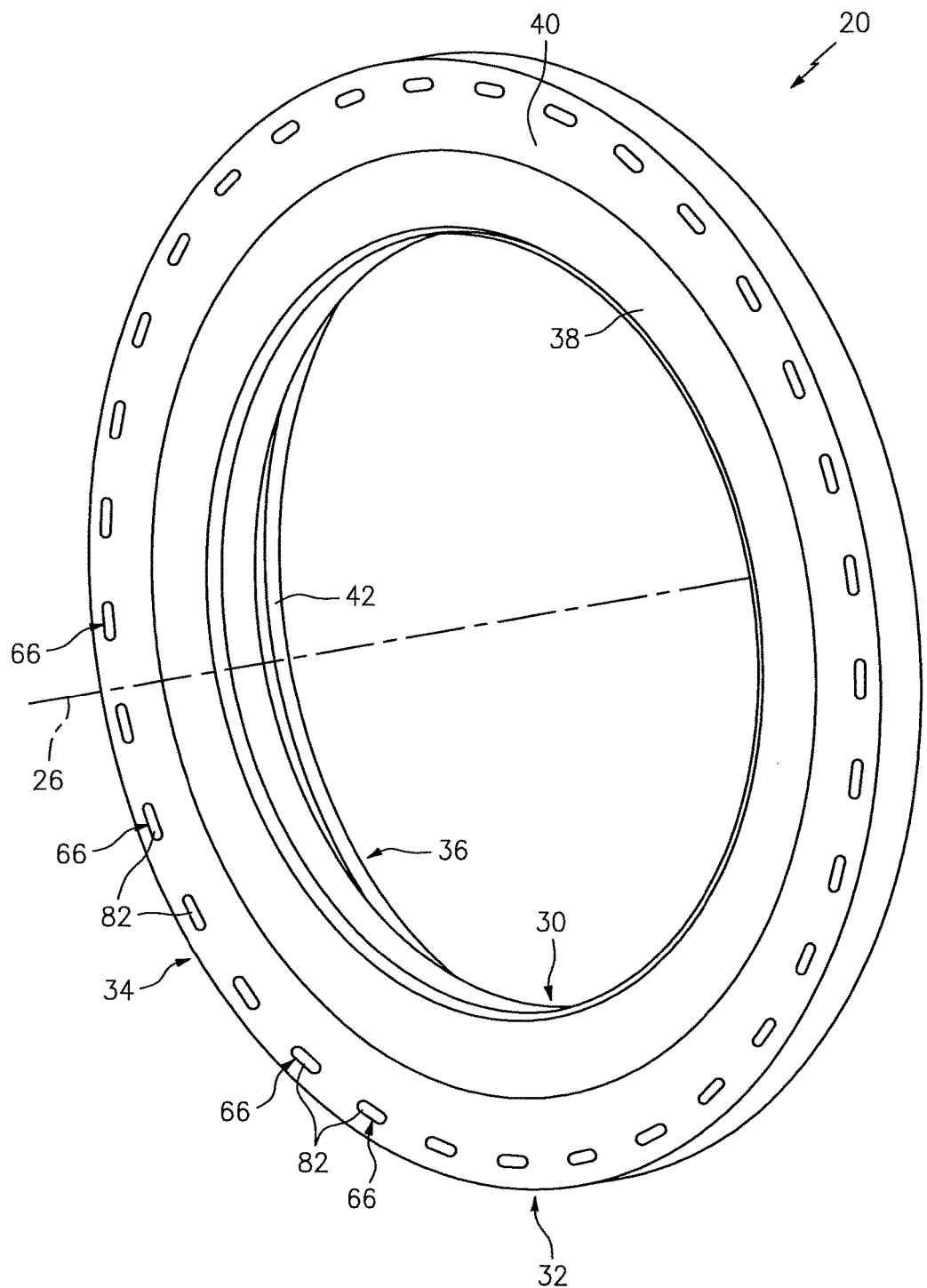
FIG. 2 is a perspective illustration of a first side of a rotational seal element for the assembly.
Figure 3:
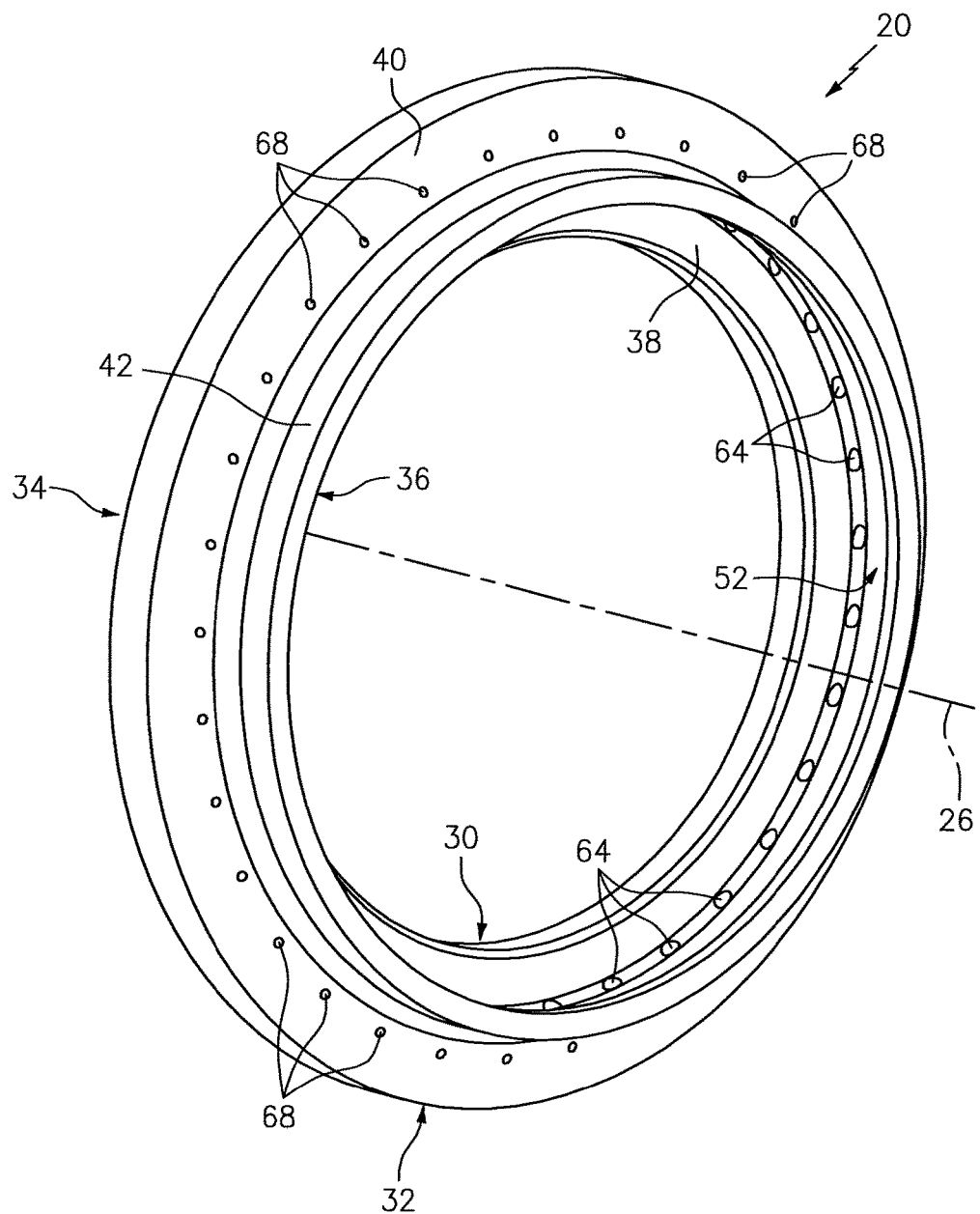
FIG. 3 is a perspective illustration of a second side of the rotational seal element.

The rotational seal element 20 may be configured as an annular seal plate. The rotational seal element 20 of FIGS. 2-4, for example, extends circumferentially around the axis 26. This rotational seal element 20 extends radially between a radial inner end 30 and a radial outer end 32. The rotational seal element 20 also extends axially along the axis 26 between opposing first and second sides 34 and 36.

Figure 4:
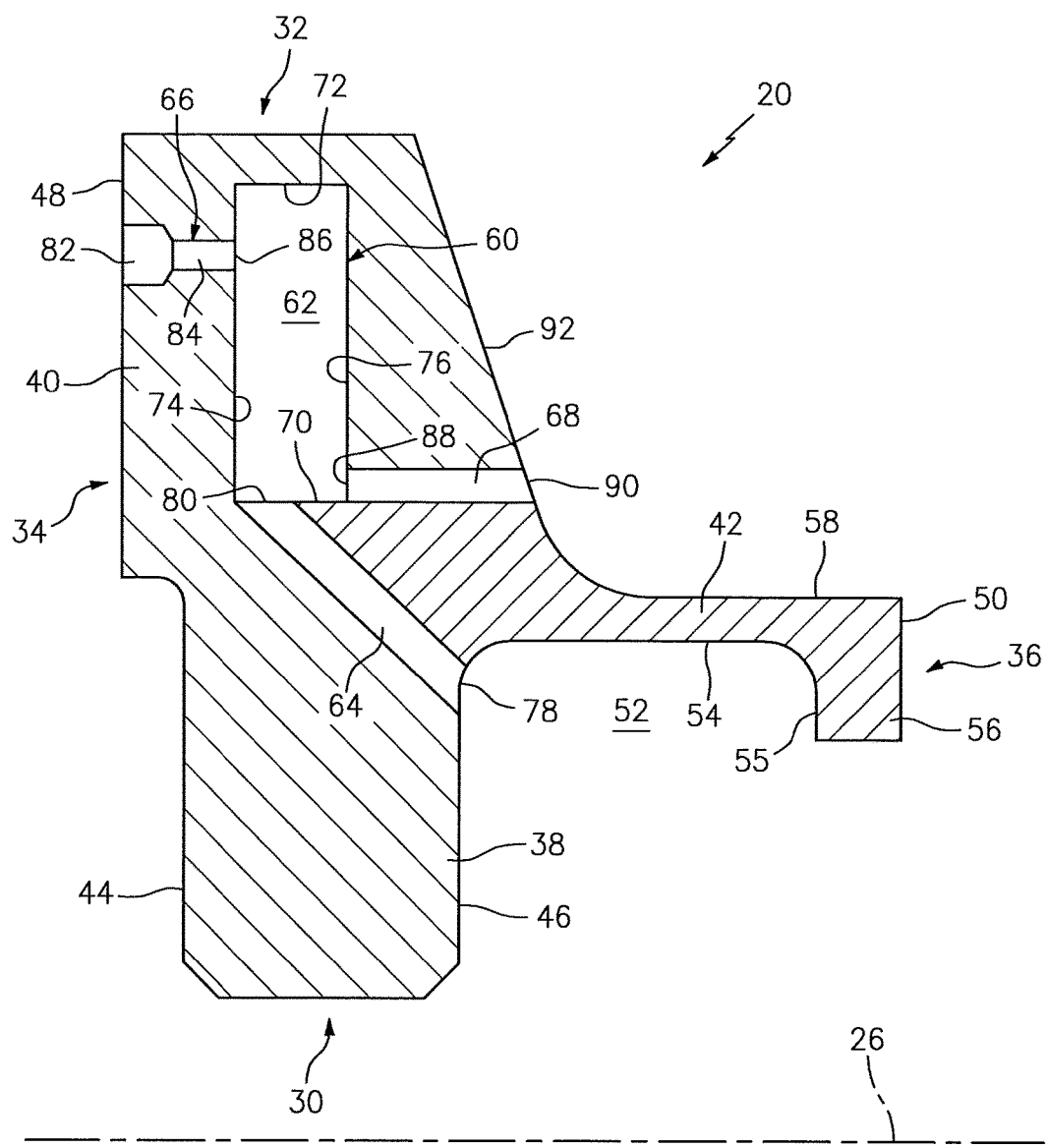
FIG. 4 is a schematic side-sectional illustration of a top half portion of the rotational seal element.

Referring to FIG. 4, the rotational seal element 20 includes an annular base 38, an annular seal land 40 and an annular scoop 42. The base 38 extends radially between the radial inner end 30 and the radial outer end 32. The base 38 extends axially between opposing annular mounting surfaces 44 and 46, which extend generally radially to the radial inner end 30.

The seal land 40 projects axially out from the base 38 at (e.g., on, adjacent or proximate) the radial outer end 32 to an annular seal land surface 48 at the first side 34. The seal land surface 48 is arranged perpendicular to the axis 26. A radial height of the seal land surface 48 may be sized greater than a radial height of the seal element surface 28 as shown in FIG. 1.

The scoop 42 projects axially out from the base 38 to a distal end 50 at the second side 36. The scoop 42 may be located approximately radially adjacent and may be contiguous with the mounting surface 46. The scoop 42 is configured with an annular gutter 52, which is operable to collect lubricant as described below in further detail. This gutter 52 extends circumferentially around the axis 26 (see FIG. 3). The gutter 52 radially extends—in a radial outward direction—into the rotational seal element 20 to an inner radial surface 54 of the scoop 42. The gutter 52 extends axially within the rotational seal element 20 between the base 38 (e.g., the mounting surface) and a surface 55 of an annular lip 56 of the scoop 42 at the distal end 50. The lip 56 projects radially inward from an annular flange 58, which flange 58 extends axially between the lip 56 and the base 38. With such a configuration, the scoop 42 has a generally L-shaped side sectional geometry. The present disclosure, however, is not limited to the foregoing exemplary scoop configuration.

The rotational seal element 20 of FIG. 4 also includes an internal fluid circuit 60. This fluid circuit 60 includes an internal plenum 62, one or more inlet passages 64, one or more cooling passages 66 and one or more outlet passages 68. The internal plenum 62 is configured as a temporary lubricant holding chamber disposed completely within the base 38. This chamber may be an annular chamber (e.g., cavity), which extends within the rotational seal element 20 around the axis 26. Alternatively, the chamber may be one of a plurality of (e.g., arcuate) chambers within the rotational seal element 20, where each chamber extends partially around the axis 26. In such embodiments, each chamber forms a discrete internal plenum, which may be fluidly isolated or fluidly coupled by one or more fluid circuit couplings.

The internal plenum 62 extends radially within the rotational seal element 20 between a radial inner end 70 and a radial outer end 72. The internal plenum 62 extends axially within the rotational seal element 20 between opposing cavity sides 74 and 76.

Figure 5:
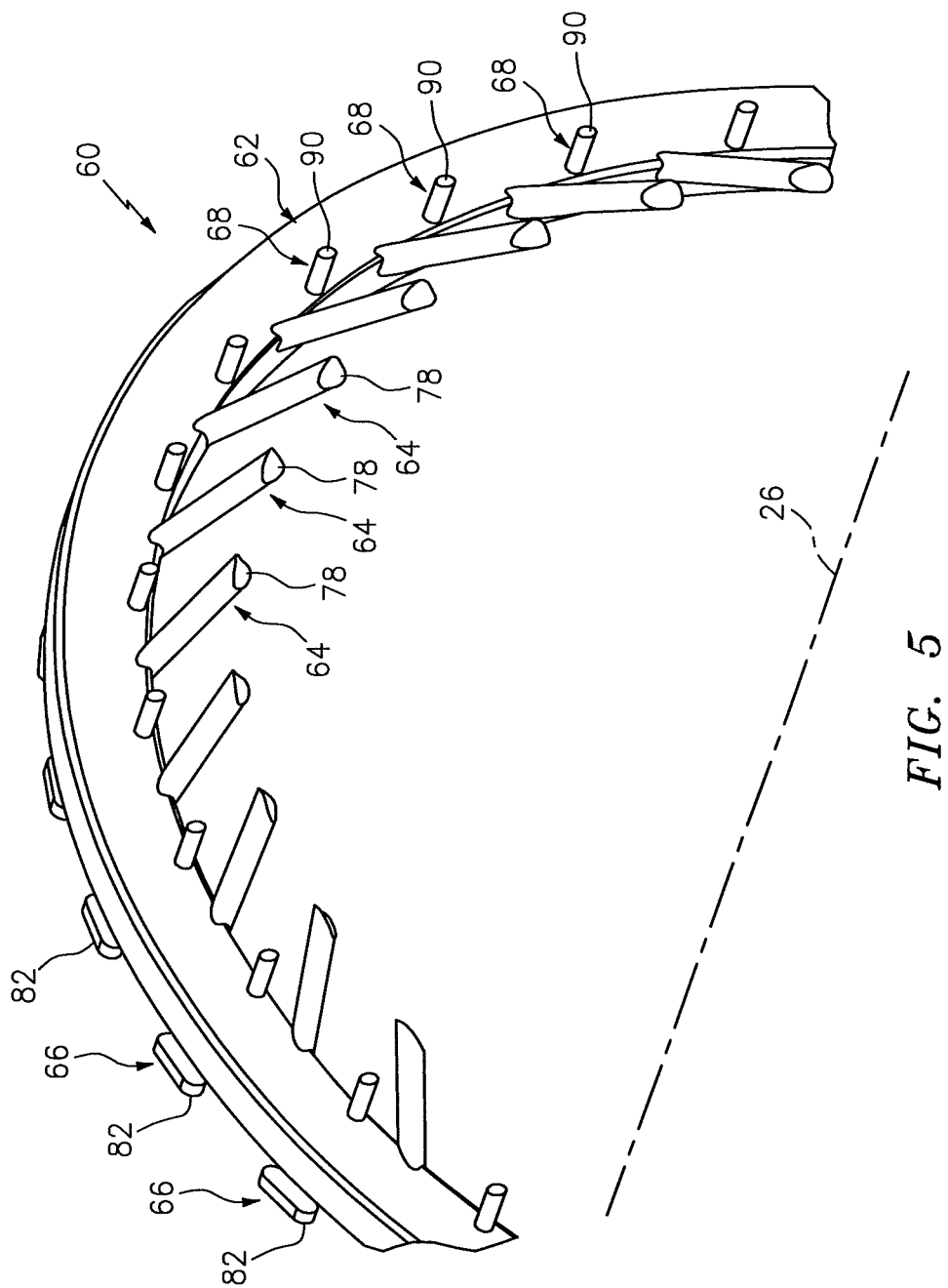
FIG. 5 is a partial perspective, schematic illustration of a first side of an internal fluid circuit within the rotational seal element.
Figure 6:
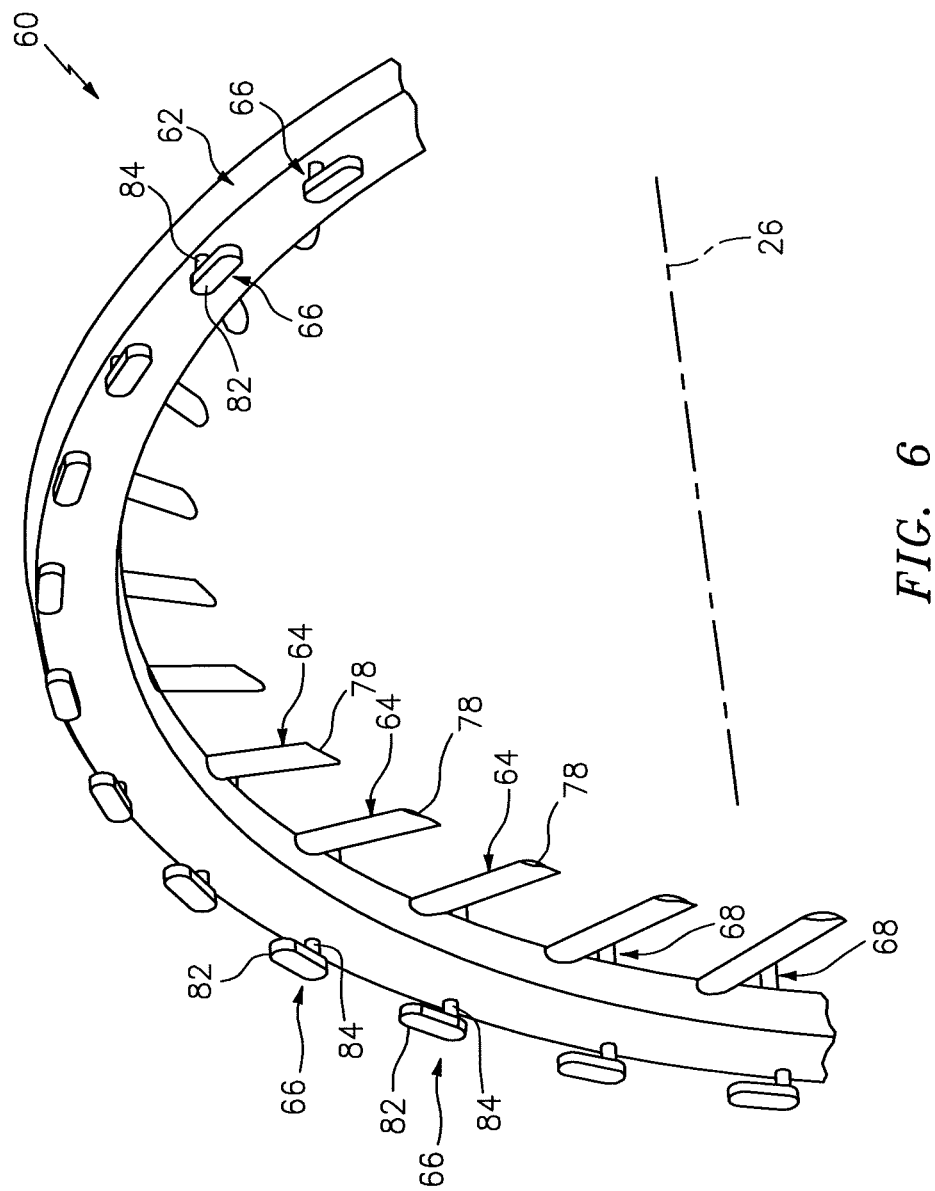
FIG. 6 is a partial perspective, schematic illustration of a second side of the internal fluid circuit.

The passages 64, 66 and 68 are respectively arranged in a plurality of circumferential arrays; e.g., see FIGS. 4-6. More particularly, the inlet passages 64 are arranged circumferentially about the axis 26. The cooling passages 66 are arranged circumferentially about the axis 26. The outlet passages 68 are arranged circumferentially about the axis 26.

Each inlet passage 64 extends into the rotational seal element 20 to the internal plenum 62. More particularly, each inlet passage 64 fluidly couples and extends along a trajectory between the gutter 52 and the internal plenum 62. The trajectory includes an axial component (e.g., right to left in FIG. 4) and a radial component (e.g., radially outwards in FIG. 4). The trajectory may also include a circumferential component as shown in FIGS. 5 and 6.

Referring again to FIG. 4, each inlet passage 64 includes and extends along its trajectory between an inlet orifice 78 and an outlet orifice 80. The inlet orifice 78 is fluidly coupled with the gutter 52. The inlet orifice 78 of FIG. 4, for example, is located at (e.g., on, adjacent or proximate) an interface between the base 38 and the scoop 42. The inlet orifice 78 also located a non-zero radial distance inward from the inner radial surface 54. The outlet orifice 80 is fluidly coupled with the internal plenum 62. The outlet orifice 80 of FIG. 4, for example, is located at (e.g., on, adjacent or proximate) the radial inner end 70 of the internal plenum 62.

Each cooling passage 66 is located radially outboard of a respective inlet passage 64 and a respective outlet passage 68. Each cooling passage 66 extends along a trajectory from the seal land surface 48 into the rotational seal element 20 to the internal plenum 62. The trajectory may substantially only include an axial component (e.g., left to right in FIG. 4). However, in other embodiments, the trajectory may also include a circumferential component.

Each cooling passage 66 of FIG. 4 includes a pocket 82 and a conduit 84 (see also pockets in FIGS. 5 and 6). The pocket 82 extends from the seal land surface 48 partially into the seal land 40 to the conduit 84. The conduit 84 fluidly couples and extends between the pocket 82 and the internal plenum 62. In the specific embodiment of FIGS. 4 and 6, the pocket 82 has a radial height and a circumferential width that are both greater than a width (e.g., diameter) of the conduit 84. The present disclosure, however, is not limited to the foregoing exemplary relationship between the size of the pocket 82 and the size of the conduit 84.

Referring again to FIG. 4, each cooling passage 66 includes and extends along its trajectory to an orifice 86. This orifice 86 is fluidly coupled with the internal plenum 62. The orifice 86 of FIG. 4, for example, is located a non-zero radial distance inward from the radial outer end 72 of the internal plenum 62. The orifice 86 is thereby located radially outboard of the outlet orifice 80.

Each outlet passage 68 is located radially outboard of a respective inlet passage 64 and radially inboard of a respective cooling passage 66. Each outlet passage 68 extends along a trajectory into the rotational seal element 20 to the internal plenum 62. The trajectory may substantially only include an axial component (e.g., right to left in FIG. 4). However, in other embodiments, the trajectory may also include a circumferential component and/or a radial component (e.g., radially outwards).

Each outlet passage 68 includes and extends along its trajectory between an inlet orifice 88 and an outlet orifice 90. The inlet orifice 88 is located radially next to the radial inner end 70 of the internal plenum 62. For example, the inlet orifice 88 may be directly adjacent the radial inner end 70 or, alternatively, offset from the radial inner end 70 by a non-zero radial distance. As a result, the inlet orifice 88 is located radially outboard of the outlet orifice 80 and radially inboard of the orifice 86. The present disclosure, however, is not limited to such a spatial relationship between the orifices 80 and 88. For example, in other embodiments, the orifices 80 and 88 may be similarly situated with respect to the radial inner end 70 of the internal plenum 62.

The outlet orifice 90 shown in FIG. 4 is located in a surface 92 of the base 38, which surface 92 extends (e.g., diagonally—radially and axially) away from the scoop 42 to the radial outer end 32 of the rotational seal element 20. Thus, the outlet orifice 90 is disposed radially outboard of the scoop 42.

Referring again to FIG. 1, the stationary seal element 18 is mounted with the stationary structure 12. This stationary structure 12 may include an axial biasing mechanism such as, but not limited to, one or more axially extending coil springs (not shown). Such a biasing mechanism may enable movement (e.g., axial translation) of the stationary seal element 18 along the axis 26, while also biasing the stationary seal element 18 axially towards and against the rotational seal element 20.

The rotational seal element 20 is mounted with the rotational structure 14. For example, the rotational structure 14 may include a gas turbine engine shaft 94 and a tubular (or annular) shaft spacer 96. The rotational seal element 20 of FIG. 1 is mounted on the engine shaft 94. The mounting surface 44 axially engages (e.g., contacts and is axially abutted against) a shoulder 98 of the shaft 94. The shaft spacer 96 is also mounted on the engine shaft 94 such that the other mounting surface 46 axially engages (e.g., contacts and is axially abutted against) the shaft spacer 96. In this manner, the base 38 of the rotational seal element 20 may be axially sandwiched and clamped between the shaft shoulder 98 and the shaft spacer 96. Of course, in other embodiments, the rotational seal element 20 may be clamped between one or more other components of the rotational structure 14.

When clamped between the elements 96 and 98 of the rotational structure 14, the seal land surface 48 axially engages (e.g., contacts and is axially abutted against) the seal element surface 28. This axial engagement at the interface between the seal elements 18 and 20 substantially forms a seal between the seal elements 18 and 20.

During operation of the assembly 10 of FIG. 1, the rotational seal element 20 rotates about the axis 26 while axially engaging the stationary seal element 18. Frictional forces between the surfaces 28 and 48 may subject the rotational seal element 20 to relatively high temperatures.

To cool the rotational seal element 20, lubricant (or another cooling fluid) is directed by the nozzle(s) 22 into the compartment 24 and towards an annular space between the rotational structure 14 (e.g., the shaft spacer 96) and the scoop 42. At least some of this lubricant is collected within the gutter 52 formed by the scoop 42; see also FIG. 4.

Referring now to FIG. 4, the inlet passages 64 direct lubricant from the gutter 52 into the internal plenum 62, where a quantity of the lubricant collects and/or churns within the plenum 62 at the radial outer end 72. A portion of this lubricant within the internal plenum 62 flows through the cooling passages 66 to the interface between the seal elements 18 and 20; see FIG. 1. At the interface, the lubricant may churn and/or collect within the pockets 82 before flowing back through the cooling passages 66 and into the internal plenum 62. Another portion of the lubricant within the internal plenum 62 flows through the outlet passages 68 and is discharged from the rotational seal element 20. In this manner, the fluid circuit 60 flows the lubricant through the passages 64, 66 and 68 and the internal plenum 62 and provides conductive cooling for the rotational seal element 20. More particularly, heat energy may be transferred from the rotational seal element 20 into the lubricant as the lubricant flows through the fluid circuit 60. Incorporation of the internal plenum 62 into the fluid circuit 60 enables a quantity of the lubricant to be temporarily contained internally within the rotational seal element 20 and, thereby, increases time for heat transfer between the rotational seal element 20 and the lubricant.

Figure 7:
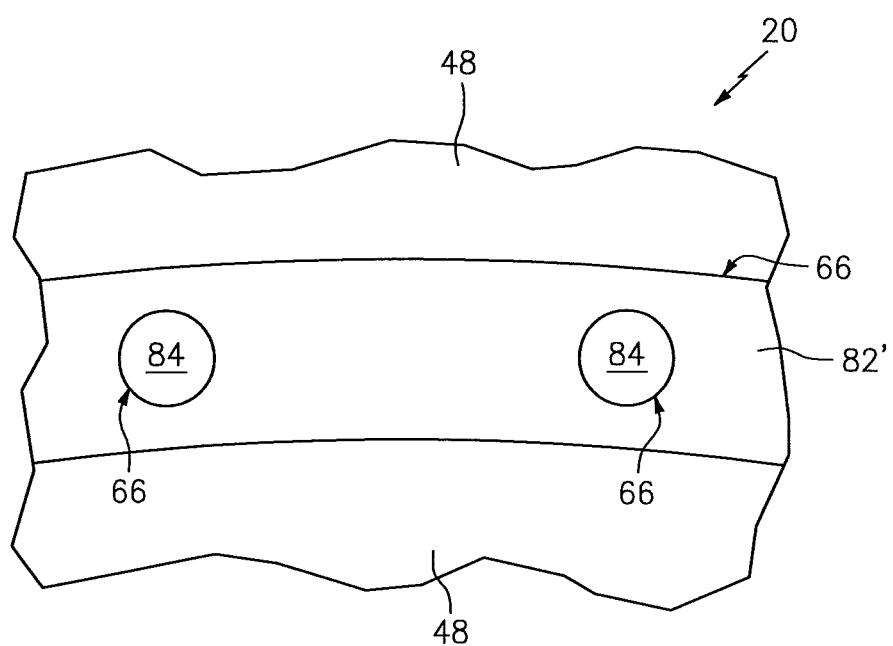
FIG. 7 is an end view illustration of a portion of a seal land for an alternative embodiment rotational seal element.

In some embodiments, referring to FIG. 7, one or more or all of the pockets may be combined into a common pocket 82'; e.g., an extended arcuate pocket or an annular groove. Such a common pocket 82' may be fluidly coupled with some or all of the cooling passages 66.

Figure 8:
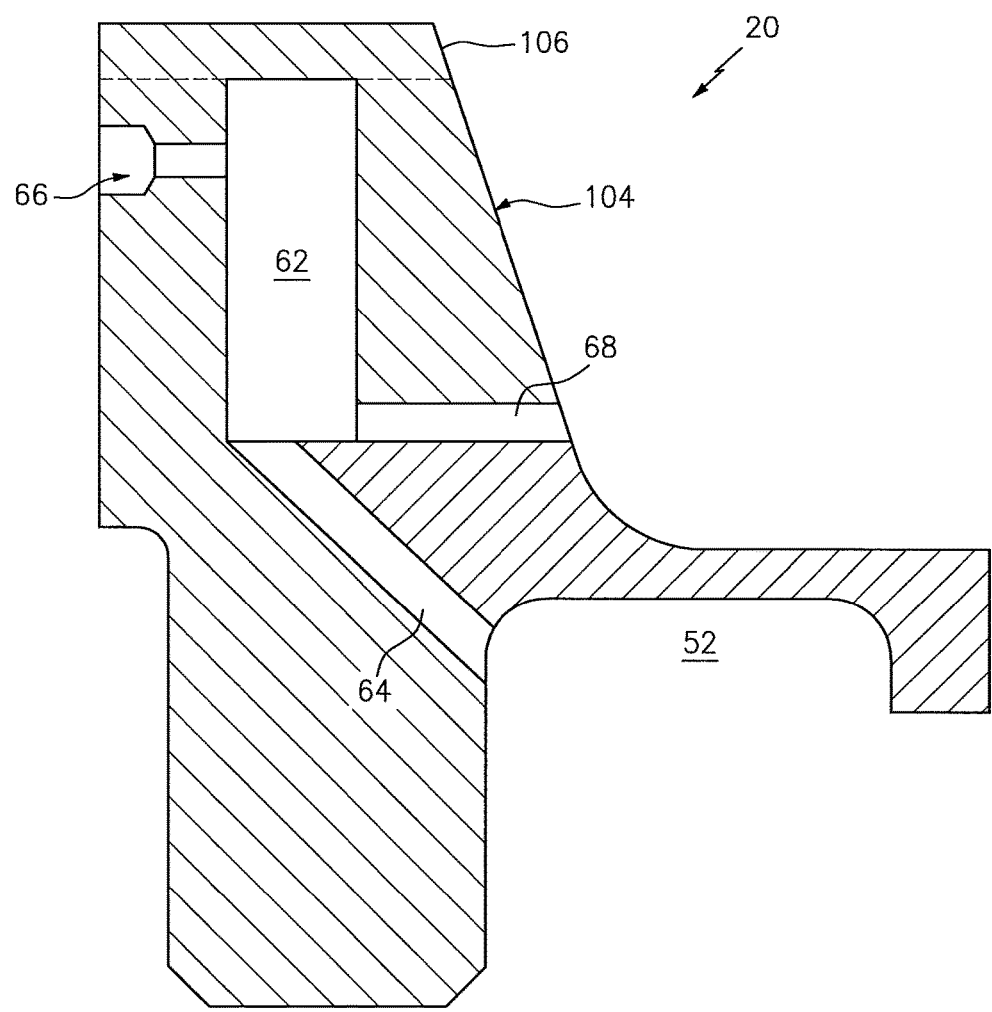
FIG. 8 is another schematic side-sectional illustration of a top half portion of the rotational seal element.

The above described rotational seal element 20 may be configured as a monolithic body. The term "monolithic" is used herein to describe a body that is formed from a single mass of material, or multiple masses of material that have been bonded (e.g., welded, brazed, adhered, etc.) together. For example, referring to FIG. 8, the rotational seal element 20 may be formed from a major (e.g., base) portion 104 and a cap 106, where the cap 106 is bonded to the major portion 104 after formation of the internal plenum 62 within the major portion 104. The present disclosure, however, is not limited to such an exemplary embodiment or a monolithic configuration.

Figure 9:
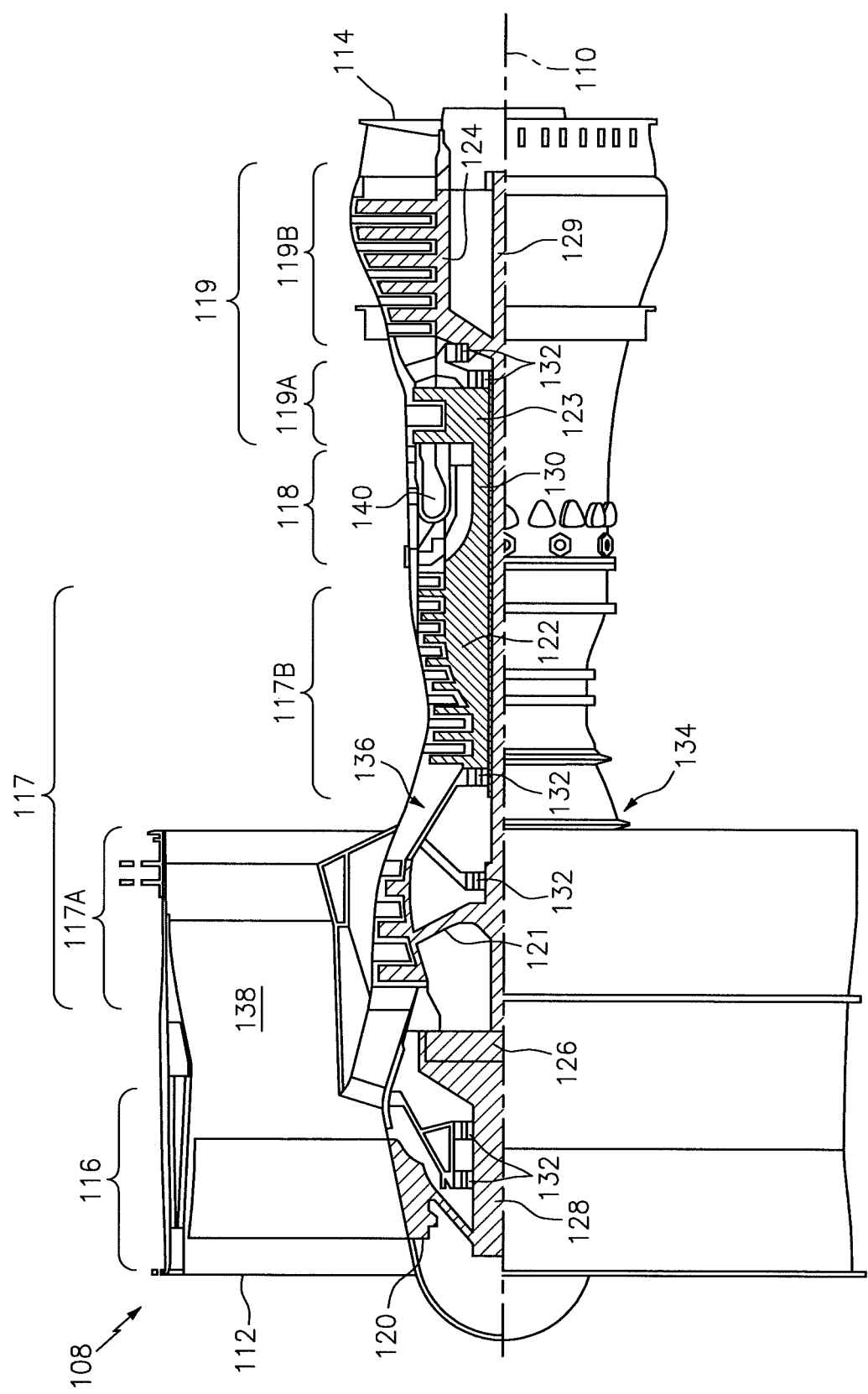
FIG. 9 is a side cutaway illustration of a geared turbine engine.

FIG. 9 is a side cutaway illustration of a geared turbine engine 108 in which the assembly 10 of FIG. 1 may be included. This turbine engine 108 extends along an axial centerline 110 (e.g., the axis 26) between an upstream airflow inlet 112 and a downstream airflow exhaust 114. The turbine engine 108 includes a fan section 116, a compressor section 117, a combustor section 118 and a turbine section 119. The compressor section 117 includes a low pressure compressor (LPC) section 117A and a high pressure compressor (HPC) section 117B. The turbine section 119 includes a high pressure turbine (HPT) section 119A and a low pressure turbine (LPT) section 119B.

Each of the engine sections 116, 117A, 117B, 119A and 119B includes a respective rotor 120-124. Each of these rotors 120-124 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 120 is connected to a gear train 126, for example, through a fan shaft 128. The gear train 126 and the LPC rotor 121 are connected to and driven by the LPT rotor 124 through a low speed shaft 129. The HPC rotor 122 is connected to and driven by the HPT rotor 123 through a high speed shaft 130. The shafts 128-130 are rotatably supported by a plurality of bearings 132, where one of these shafts 128-130 may be the engine shaft 94 of FIG. 1. Each of the bearings 132 is connected to an engine housing 134 by at least one stationary structure such as, for example, an annular support strut.

During operation, air enters the turbine engine 108 through the airflow inlet 112. This air is directed through the fan section 116 and into a core gas path 136 and a bypass gas path 138. The core gas path 136 flow sequentially through the engine sections. The air within the core gas path 136 may be referred to as "core air". The air within the bypass gas path 138 may be referred to as "bypass air".

The core air is compressed by the compressor rotors 121 and 122 and then directed into a combustion chamber 140 of a combustor in the combustor section 118. Fuel is injected into the combustion chamber 140 and mixed with the compressed core air to provide a fuel-air mixture. This fuel air mixture is ignited and combustion products thereof flow through and sequentially cause the turbine rotors 123 and 124 to rotate. The rotation of the turbine rotors 123 and 124 respectively drive rotation of the compressor rotors 122 and 121 and, thus, compression of the air received from a core airflow inlet. The rotation of the turbine rotor 124 also drives rotation of the fan rotor 120, which propels bypass air through and out of the bypass gas path 138. The propulsion of the bypass air may account for a majority of thrust generated by the turbine engine 108, e.g., more than seventy-five percent (75%) of engine thrust. The turbine engine 108 of the present disclosure, however, is not limited to the foregoing exemplary thrust ratio.

The assembly 10 may be included in various turbine engines other than the one described above as well as in other types of rotational equipment. The assembly 10, for example, may be included in a geared turbine engine where a gear train connects one or more shafts to one or more rotors in a fan section, a compressor section and/or any other engine section. Alternatively, the assembly 10 may be included in a turbine engine configured without a gear train. The assembly 10 may be included in a geared or non-geared turbine engine configured with a single spool, with two spools (e.g., see FIG. 9), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A sealing apparatus for rotational equipment, comprising:
an annular seal plate rotatable around an axis;
the annular seal plate including an annular seal land surface, an internal plenum, a plurality of inlet passages, a plurality of cooling passages and a plurality of outlet passages;
the inlet passages arranged about the axis, at least one of the inlet passages extending into the annular seal plate to the internal plenum;
the cooling passages arranged about the axis, at least one of the cooling passages extending into the annular seal plate from the annular seal land surface to the internal plenum; and
the outlet passages arranged about the axis, at least one of the outlet passages extending into the annular seal plate to the internal plenum, wherein the outlet passages are arranged radially between the inlet passages and the cooling passages.

2. The sealing apparatus of claim 1, further comprising a stationary seal element configured to axially engage the annular seal land surface, wherein the axial engagement substantially forms a seal between the stationary seal element and the annular seal plate.

3. The sealing apparatus of claim 1, wherein the internal plenum comprises an annular chamber disposed within the annular seal plate.

4. The sealing apparatus of claim 1, wherein
a first of the inlet passages includes an outlet orifice fluidly coupled with the internal plenum and located at a radial inner end of the internal plenum;
a first of the outlet passages includes an inlet orifice fluidly coupled with the internal plenum, and the inlet orifice is located radially outboard of the outlet orifice; and
a first of the cooling passages includes a cooling passage orifice fluidly coupled with the internal plenum, and the cooling passage orifice is radially outboard of the inlet orifice.

5. The sealing apparatus of claim 4, wherein the inlet orifice is located radially next to the radial inner end of the internal plenum.

6. The sealing apparatus of claim 4, wherein the cooling passage orifice is located a non-zero radial distance from a radial outer end of the internal plenum.

7. The sealing apparatus of claim 1, wherein the annular seal plate extends axially along the axis between a first side and a second side, a first of the inlet passages and a first of the outlet passages are disposed towards the first side, and a first of the cooling passages is disposed towards the second side.

8. The sealing apparatus of claim 1, wherein
the annular seal plate further includes a lubricant scoop;
the lubricant scoop forms an annular gutter; and
the inlet passages fluidly couple and extend between the annular gutter and the internal plenum.

9. The sealing apparatus of claim 1, wherein
a first of the cooling passages comprises a pocket and a conduit;
the pocket extends into the annular seal plate from the annular seal land surface; and
the conduit fluidly couples and extends between the pocket and the internal plenum.

10. A sealing apparatus for rotational equipment, comprising:
a stationary seal element; and
a rotational seal element rotatable around an axis;
the rotational seal element including a seal land surface, a plenum, a plurality of inlet passages, a plurality of cooling passages and a plurality of outlet passages;
the seal land surface configured to axially and sealingly engage the stationary seal element;
the inlet passages configured to receive fluid from outside of the rotational seal element and supply the fluid to the plenum;
the cooling passages configured to flow the fluid between the plenum and an interface between the stationary seal element and the rotational seal element; and
the outlet passages configured to discharge the fluid from the plenum and out of the rotational seal element.

11. The sealing apparatus of claim 10, wherein the plenum is formed within the rotational seal element and extends circumferentially about the axis.

12. The sealing apparatus of claim 10, wherein
each of the inlet passages extends into the rotational seal element to the plenum;
each of the cooling passages extends into the rotational seal element from the seal land surface to the plenum; and
each of the outlet passages extends into the rotational seal element to the plenum.

13. The sealing apparatus of claim 10, wherein the first of the inlet passages includes an outlet orifice fluidly coupled with the plenum and located at a radial inner end of the plenum.

14. The sealing apparatus of claim 13, wherein the first of the cooling passages includes a cooling passage orifice fluidly coupled with the plenum and located a non-zero radial distance from a radial outer end of the plenum.

15. The sealing apparatus of claim 14, wherein the first of the outlet passages includes an inlet orifice fluidly coupled with the plenum and located radially next to the radial inner end of the plenum.

16. The sealing apparatus of claim 10, wherein
the rotational seal element further includes a lubricant scoop;
the lubricant scoop forms an annular gutter; and
the inlet passages fluidly couple and extend between the annular gutter and the plenum.

17. The sealing apparatus of claim 10, wherein
a first of the cooling passages comprises a pocket and a conduit;
the pocket extends into the rotational seal element from the seal land surface; and
the conduit fluidly couples and extends between the pocket and the plenum.

18. The sealing apparatus of claim 10, wherein
the rotational seal element further includes a pocket that extends into the rotational seal element from the seal land surface; and
two or more of the cooling passages fluidly couple and extend between the pocket and the plenum.

19. A sealing apparatus for a gas turbine engine, comprising:
a stationary structure of the gas turbine engine;
a gas turbine engine shaft rotatable around an axis;
a stationary seal element mounted with the stationary structure; and
a monolithic rotational seal element mounted with the gas turbine engine shaft, the monolithic rotational seal element including a seal land surface and a fluid circuit, the seal land surface configured to axially and sealingly engage the stationary seal element, and the fluid circuit comprising an annular plenum configured internally within the monolithic rotational seal element;

wherein the fluid circuit further includes a plurality of inlet passages, a plurality of cooling passages and a plurality of outlet passages;

wherein the inlet passages are arranged about the axis, and each of the inlet passages extends into the monolithic rotational seal element to the annular plenum;

wherein the cooling passages are arranged about the axis, and each of the cooling passages extends into the monolithic rotational seal element from the seal land surface to the annular plenum; and wherein the outlet passages are arranged about the axis, and each of the outlet passages extends into the monolithic rotational seal element to the annular plenum.

* * * * *